United States Patent [19]
Campbell

[11] 3,875,750
[45] Apr. 8, 1975

[54] MODULAR EROSION CONTROL DEVICE
[76] Inventor: Herbert Campbell, 10281 Rt. 306, Kirtland, Ohio 44094
[22] Filed: Jan. 4, 1974
[21] Appl. No.: 430,783

[52] U.S. Cl. .................................................. 61/4
[51] Int. Cl............................................. E02b 3/06
[58] Field of Search ...................... 61/4, 5, 6, 3, 2

[56] References Cited
UNITED STATES PATENTS

| | | | |
|---|---|---|---|
| 2,466,343 | 4/1949 | Weber | 61/4 |
| 3,096,621 | 7/1963 | Danel | 61/4 |
| 3,415,061 | 12/1968 | Staempeli | 61/4 |
| 3,538,710 | 11/1970 | Tourmen | 61/4 |
| 3,653,216 | 4/1972 | Stickler, Jr. | 61/4 |

FOREIGN PATENTS OR APPLICATIONS

| | | | |
|---|---|---|---|
| 1,373,090 | 7/1963 | France | 61/5 |
| 707,767 | 3/1935 | France | 61/4 |
| 17,162 | 6/1912 | Denmark | 61/4 |

*Primary Examiner*—Paul R. Gilliam
*Assistant Examiner*—Alix Grosz

[57] ABSTRACT

A modular unit for marine use in preventing and reversing erosion of waterfront land due to wave action is described. The device is an elongated block which in cross-section has a topmost peak and at least one additional lower peak located forwardly (toward the water) of the topmost peak. The peaks are separated by depressions, and each of them is defined at least in part by a rearwardly sloping surface.

11 Claims, 9 Drawing Figures

PATENTED APR 8 1975 3,875,750

MODULAR EROSION CONTROL DEVICE

BACKGROUND OF THE INVENTION

This invention relates generally to erosion control devices for shorelines, and more particularly to modular units for use in a marine environment adjacent the shoreline to prevent and reverse erosion due to wave action.

The problem of erosion of shorelines due to wave action is an old and well recognized phenomenon. During periods of heavy wave activities on lakes, oceans, and the like, the sand, stone, dirt, and other loose materials along the shoreline tend to be loosened and wash into the lake causing an erosion problem characterized by the gradual washing away of the bank. The many problems resulting from this are well known and need not be enumerated herein.

There have been many prior art devices and techniques for preventing erosion but all of them have suffered from certain limitations. Some of these devices are very cumbersome and very difficult and expensive to form and install. Others, while working satisfactorily in light or moderate wave action, tend to become dislodged or cease to function properly in heavy wave action. Still others tend themselves to be eroded or to merely temporarily stop erosion but after a period of time permit either the same or a different form of erosion.

SUMMARY OF THE INVENTION

According to the present invention a modular unit for marine use for preventing and reversing erosion of water from land subject to wave action is provided. The device has a central peak with at least one additional peak located forwardly thereof and of a lower height. The peaks are separated by depressions or valleys and are directed toward the water. The forward faces of the peaks are sloped rearwardly and the devices are placed adjacent the shoreline. Under the action of the waves, even heavy waves, the sloped configuration directs and deflects the waves generally upwardly and over the devices while the rear parts and the peak and valley configuration traps the sand and other solid material carried by the waves as it retreats thus preventing the washing away of sand from the shoreline area and in fact trapping incoming sand and thereby not only preventing additional erosion but actually building up additional ground by virtue of the trapped solid material.

DESCRIPTION OF THE PREFERRED EMBODIMENTS

Figure 1:
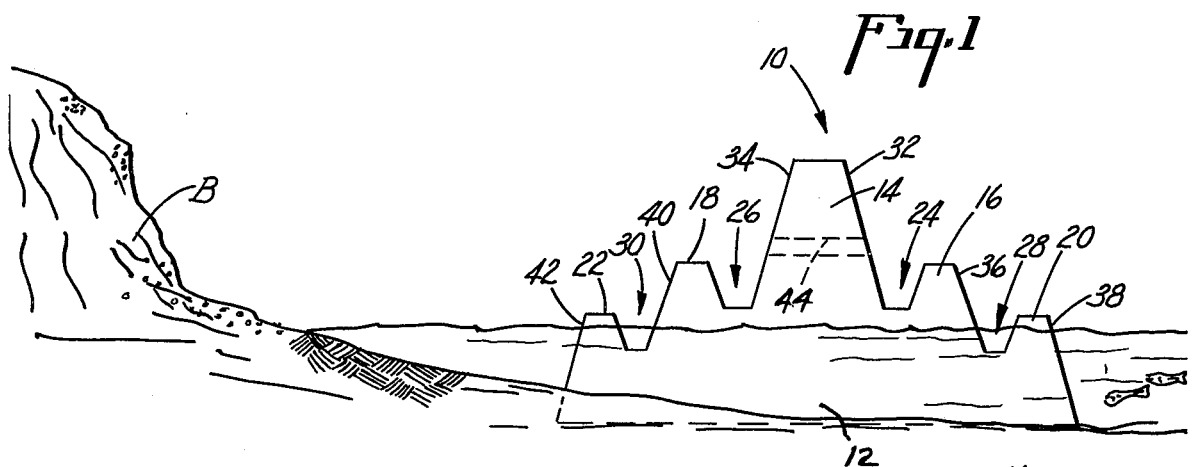
FIG. 1 is an elevational view of one embodiment of a modular unit according to this invention showing it in place and in position for use to prevent and reverse erosion of the shoreline of a body of water.
Figure 2:
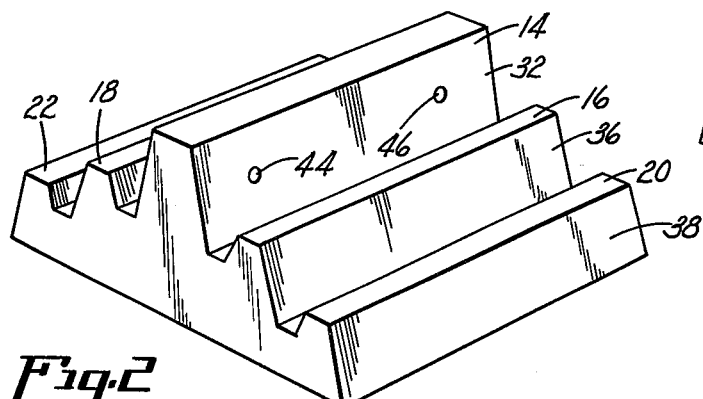
FIG. 2 is a perspective view of the device of FIG. 1.

Referring now to the drawing and for the present to FIGS. 1 and 2, one embodiment of a modular unit for marine use in preventing and reversing erosion of waterfront land subject to wave action is shown. The device is basically in the form of a cast concrete body designated generally by the reference character 10. The device includes a base section 12 from which upwardly projects a central or topmost peak member 14. A pair of peak members 16 and 18 are located on opposite sides thereof, and a pair of outside peak members 20 and 22 are located outside of the peak members 16 and 18. The peaks 14 and 16 are separated by a depression 24; the peaks 14 and 18 are separated by a depression 26; the peaks 16 and 20 are separated by a depression 28 and the peaks 18 and 22 are separated by a depression 30. Thus the device in cross-section has a central or top-most peak 14 flanked by two lower peaks 16 and 18 which in turn are flanked by two still lower peaks 20 and 22, with all of the peaks being separated by depressions or valleys.

Each of the peaks 14, 16, 18, 20, and 22 are formed at least in part by sloping surfaces 32, 34, 38, 40, and 42. These surfaces slope toward the central plane passing vertically through the topmost peak 14. Also, each of the peaks is flattened on the top rather than coming to a pointed configuration.

Also, the units are formed with a pair of through openings 44 and 46 passing through the central peak 14 which are of sufficient size and located in such a way as to allow a chain or a bar or other lifting member to pass therethrough and allow the units to be lifted and emplaced.

In this embodiment the device is symetrical about a vertical plane passing through the central peak 14 and hence either side may be utilized as the front side or the side directed toward the water.

The device is shown in use in FIG. 1 and, as indicated above, in this embodiment since the device is symetrical either side may be placed facing the water. When there is wave action generated by the water the waves will break against the surfaces 32, 36, and 38. These surfaces (with the block thus emplaced) constitute the forwardly directed side of the device and they thus slope rearwardly, i.e. toward the opposite side of the device. Because of this sloped configuration of the surfaces 32, 36, and 38 the waves are deflected generally upwardly and over the device and broken into spray thereby. Hence the device prevents the force of the waves from acting against the bank B located rearwardly from the device. Also, the depressions in the device catch the water and any trapped material in the water such as sand and gravel and other loose debris and actually retain in these depressions the sand or other solid materials while allowing the water to drain off. Hence under even strong wave action the waves are deflected upwardly, broken into spray, and prevented from directly impinging upon the bank thereby preventing erosion. Also, loose material is trapped on the rear side of the device and also is actually trapped in the devices and they in effect become sand or solid material trapping devices thus retaining the solid material and actually building out the shoreline as a result of wave action.

The modular type construction of these devices allow them to be placed adjacent each other forming a line as long as desired along the beach, the devices being placed in end to end relationship thus enabling essentially a continuous barricade to be formed of modular construction to whatever length is desired.

Figure 3:
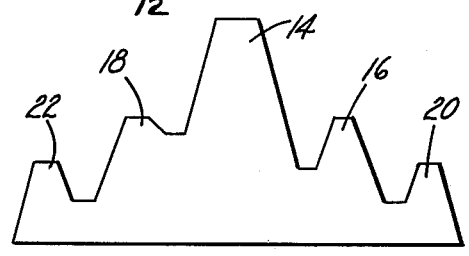
FIGS. 3 through 9 are elevational views of various embodiments of the invention with modified cross-sectional configurations from that of the device of FIGS. 1 and 2.
Figure 4:
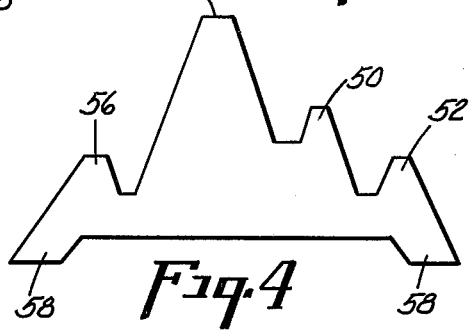

FIGS. 3 through 8 are all different embodiments showing various modifications of the device of FIGS. 1 and 2. Specifically, FIG. 3 shows a device similar to FIG. 2 except that the depressions between the central peak and the two adjacent peaks are of different depths and the depressions between these two adjacent peaks and the peaks adjacent them are also of a different depth with this device thus being an asymetrical device. FIG. 4 device is shown having two peaks 50 and 52 on one side of a central peak 54 and but one peak 56 on the other side of the central peak 54. Also in FIG. 4, the base section is not flat across the bottom thereof as shown in FIG. 1, 2, and 3, but rather a pair of depending legs 58 are provided forwardly and rearwardly which allows the device to sink somewhat deeper into the sand at the forward and rearward edges than the devices of FIGS. 1 through 3. In the case of the devices of both FIGS. 3 and 4 the units can be oriented with either side directed toward the water although with respect to the device of FIG. 4 it is preferred that the side having two peaks be directed toward the water rather than that having one peak. However, in both of these cases either way the device is directed toward the water there will be a central peak and at least one peak located forwardly thereof, each defined at least in part by a rearwardly sloping surface.

Figure 5:
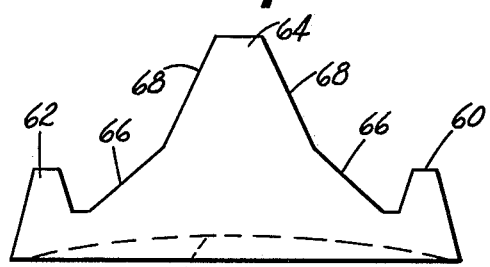

FIG. 5 shows a device which, like that of FIGS. 1 and 2, is symetrical, but this device has but one peak 60 located forwardly and one peak 62 rearwardly of the central or topmost peak 64. Also, in this device the surface defining the top peak is in two sections, 66 and 68, having different angles. This device also can be oriented with either side directed toward the water. Also, in FIG. 5, the bottom is slightly concave as shown at 69. This helps the device to dig in much like the legs of FIG. 4.

Figure 6:
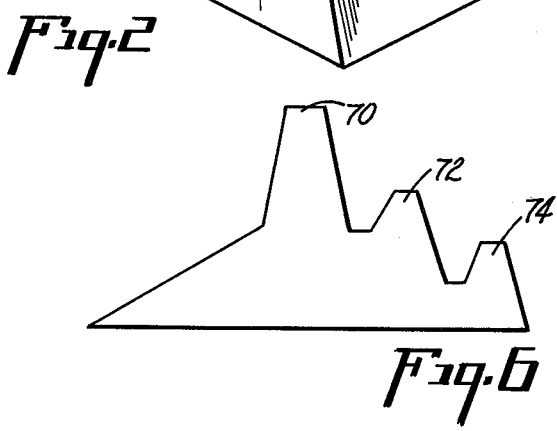
Figure 9:
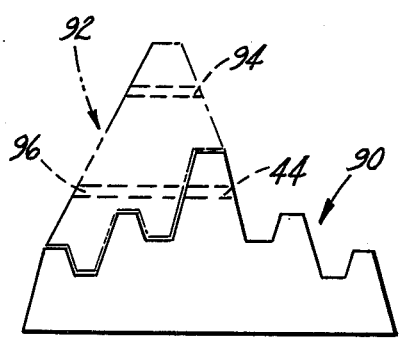
Figure 7:
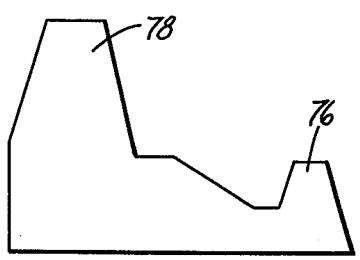
Figure 8:
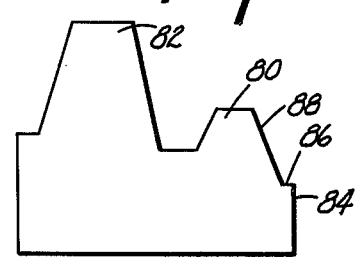

FIGS. 6 through 8 show devices which have topmost peaks with peaks located on but one side thereon. In FIG. 6 there is a central topmost peak 70 with two successively lower peaks 72 and 74, located forwardly thereof. In FIG. 7 the device is shown with but one peak 76 located forwardly of the topmost peak 78. FIG. 8 also shows a device of but one peak 80 located forwardly of the topmost peak 82. However, in FIG. 8 the front surface thereof adjacent the peak is formed with a vertical portion which then has a horizontal step 86 into the forwardly sloped portion 88 of the forward peak. In the case of the devices of FIGS. 6 through 8, each of these is asymetrical and is designed to have the forward side thereof, i.e. the side toward the water, being the side with the peaks with the rearward surface being of different configuration or without peaks as illustrated. FIG. 9 shows a unit made in two sections. The bottom section 90 is the same as the unit of FIGS. 1 and 2 and the top section 92 is cast to be emplaced thereon, thus raising the height of the topmost peak, and is useful where weight consideration would make handling difficult or impractical. Lifting openings 94 are located in the upper portion of the top section 92 and also openings 96 are provided aligned with the lifting opening 46 of the bottom section to allow a solid bar or cable to move therethrough and aid in tying the sections together.

While various transverse cross-sectional configurations have been illustrated the device basically relies on a topmost peak having at least one lower peak on the forward side thereof, with each adjacent peak separated by depression or a valley. Also, the forwardly directed surfaces defining each of the peaks must be formed at least in part of the rearwardly sloping surface, so as to deflect the waves upwardly and over the device with the depressions acting as traps to catch and retain the trapped solid material such as sand and gravel thereby not only preventing erosion, but actually forming additional solid shoreline. Also, it is contemplated that the units could be completely submerged, rather than partially exposed as above in FIG. 1, and act as a submerged reef.

What is claimed is:

1. A plurality of modular units within the water at a waterfront preventing further erosion and reversing erosion that has occured of waterfront land subject to wave action each unit comprising, an elongated essentially completely solid block having a bottom side for supporting the device, a top side projecting above water, a forwardly directed side for facing toward the waves, and a rearwardly directed side facing away from the waves toward the shore, said unit in transverse cross section having a topmost peak and at least one additional peak on the forwardly directed side thereof, each adjacent peak being separated by a depression therebetween, each of said peaks being defined in part by a surface on the forwardly directed side facing the water, each of which surface slopes toward the rearwardly directed side at least at the top portion thereof, each of the peaks from the topmost peak being progressively shorter in height from the bottom side, said units being disposed in end to end relationship whereby the sloping surfaces will break the waves into spray allowing the water in spray form to pass thereover thereby preventing further erosion, and whereby the depression will collect solid particulate material in the water run-off thereby reversing previous erosion.

2. The invention as defined in claim 1 wherein each of said peaks has a flattened top surface.

3. The invention as defined in claim 1 wherein there is at least one peak on the rearward side of the unit lower in height then the topmost peak.

4. The invention as defined in claim 3 wherein there are the same number of peaks on the rearward side of the topmost peak as on the forward side thereof.

5. The invention as defined in claim 4 wherein the unit is symetrical on opposite sides of the topmost peak.

6. The invention as defined in claim 4 wherein the unit is asymetrical on opposite sides of the topmost peak.

7. The invention as defined in claim 1 wherein the sloping surface between two adjacent peaks is formed in two sections with different slopes.

8. The invention as defined in claim 1 wherein each peak is symetrical.

9. The invention as defined in claim 1 further characterized by at least one through opening in said topmost peak to provide for lifting of the unit.

10. The invention as defined in claim 1 wherein the unit is formed in at least two sections configured to interlock together.

11. The invention as defined in claim 1 wherein the bottom of the unit is concave.

* * * * *